Patented Oct. 22, 1940

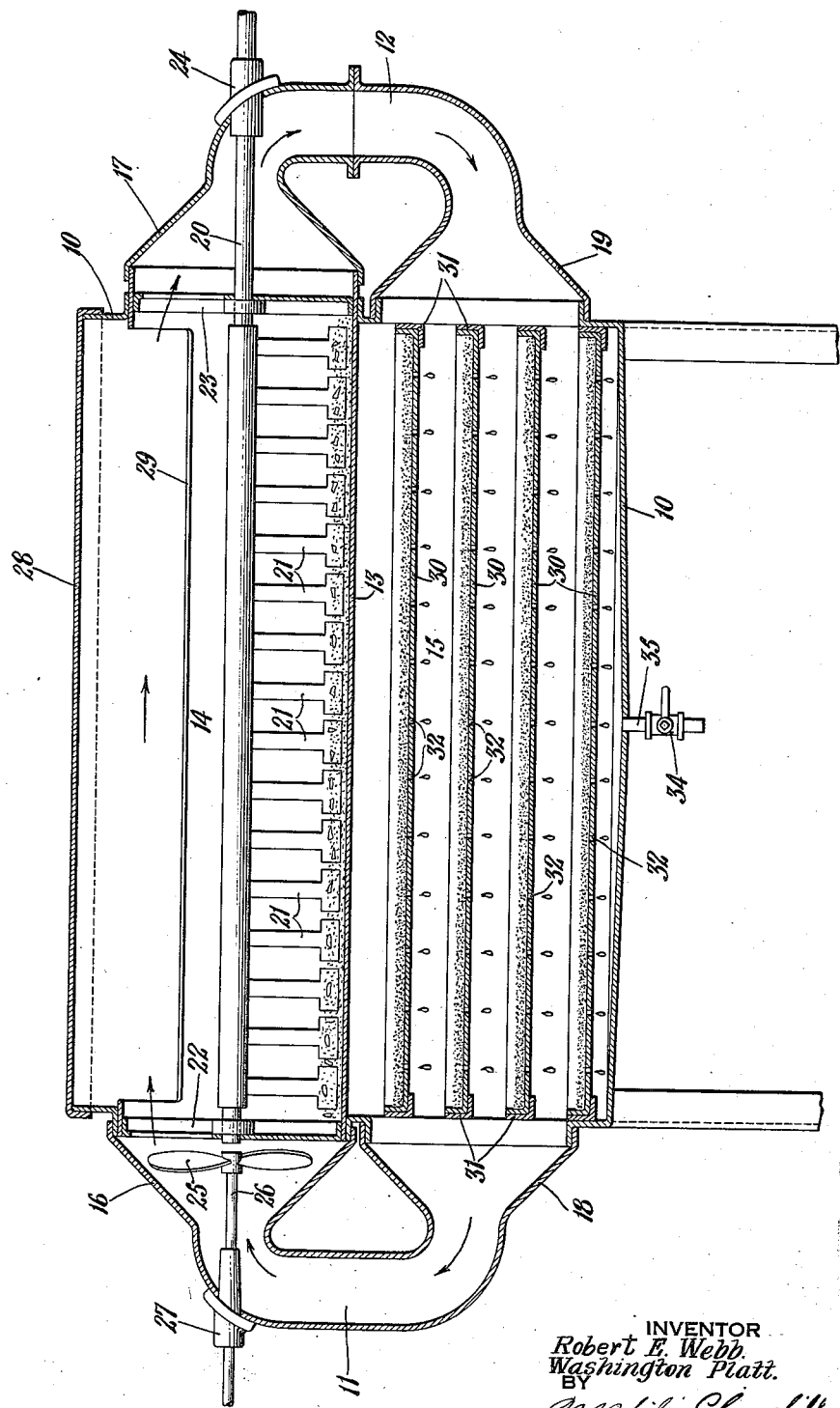

2,219,026

UNITED STATES PATENT OFFICE 2,219,026

CITRUS FRUIT GRATINGS AND THE PREPARATION THEREOF

Robert Everett Webb and Washington Platt, Syracuse, N. Y., assignors to The Borden Company, New York, N. Y., a corporation of New Jersey Application April 23, 1938, Serial No. 203,748

12 Claims. (Cl. 99—102)

This invention relates to dehydrated sugared citrus fruit peel gratings and the preparation thereof. The outside or colored portion of the rind or peel of citrus fruits contains a considerable proportion of essential oil, along with water, the oil being a valuable factor in the natural flavor of the peel. In addition, the peel and gratings of the peel contain other valuable flavoring ingredients that are desirable to conserve in prepared products made from the peel. Freshly removed gratings from oranges and lemons normally contain about 4 to 5% citrus oil and about 75% moisture. This invention is concerned with the removal of most of such moisture from the peel while retaining the volatile oils and other flavoring ingredients for the natural flavor they supply to the dehydrated product.

Heretofore, candied citrus fruit peel has been prepared by boiling, heating, or otherwise cooking slices of the peel in water or in the open air and thereafter coating them with sugar, which acts as a preservative. Such processes, however, volatilize and drive off the essential oils as well as the water and leave the peel with a distinctly unnatural flavor.

An object of this invention is to provide citrus fruit peel or gratings containing a low percentage of moisture, around 15% or less, while retaining a major portion of the citrus oil present in the natural peel.

Further objects of this invention are to provide an improved process of preparing our new product.

The figure of the drawing illustrates somewhat diagrammatically a vertical section through approximately the center of an apparatus suitable for carrying out our invention. Other forms of apparatus suitable for purposes of this invention will suggest themselves to those skilled in the art.

In the drawing, numeral 10 indicates the shell of a receptacle which is provided at the ends with suitable flues 11 and 12. The receptacle 10 is preferably divided longitudinally by a horizontal partition 13 into an upper chamber 14 and a lower chamber 15. Partition 13 is preferably arcuate or trough shaped in transverse section and is solid to support the material being treated. The ends of the upper chamber 14 may be connected to funnel-shaped portions 16 and 17 of the flues 11 and 12, respectively. Similarly, the ends of the lower chamber 15 may be connected to flues 11 and 12 by the funnel-shaped portions thereof 18 and 19.

Above the partition 13 is mounted a horizontal agitator shaft 20 having a plurality of agitating members 21 fixed thereon. The shaft may be journaled in suitable bearings in the fixed spiders 22 and 23 located at the ends of the upper chamber 14. One end of the shaft 20 projects through a stuffing box 24 equipped with suitable packing glands in the flue 12, and this end of the shaft may be connected to an electric motor or other power supplying means (not shown) outside of the receptacle. At the other end of the receptacle a fan 25 may be disposed fixed to one end of a shaft 26 extending through the housing 27 in the wall of flue 11. This shaft 26 and fan 25 may be rotated by any suitable device (not shown) located outside the receptacle. The upper portion of chamber 14 may be provided with an arcuate tightly fitting cover 28 designed to close a correspondingly shaped opening 29 for the introduction and removal of citrus fruit gratings. The cover 28 may be clamped in place and/or provided with a suitable air tight sealing arrangement, if desired.

Below the partition 13 a plurality of horizontal trays 30 may be disposed in suitable supporting brackets 31 in the chamber 15. These trays are preferably provided with some draining arrangement, such as the perforations 32. Alternatively, the trays might be arranged at a small angle to the horizontal and provided with suitable drainage troughs at their lower ends. The trays 30 are designed to support in extended form a quantity of a dehydrating agent such as calcium chloride. The lower portion of the shell 10 may be inclined to collect any water saturated with calcium chloride that drips from the trays 30, and a drainage pipe 33 provided with a valve 34 may be employed for withdrawing this liquid from the receptacle.

In the preferred operation of this device and our method, freshly prepared gratings of citrus fruit peel are mixed with finely divided crude or refined cane sugar. Fresh gratings are preferably employed because the gratings darken in color and acquire a disagreeable flavor upon being left in the open air at room temperature for a few days. One to four parts, by weight, of sugar to two parts, by weight, of gratings is satisfactory, although we prefer to employ a mixture of equal parts sugar and gratings. These gratings may be obtained by removing the outer portion of the peel from the fruit directly, in finely divided form, or by chopping the outer portion of the peel into small particles after it has been removed. This mixture of gratings and sugar is stirred together until a syrup tends to separate from the mixture by the solution of the sugar in the water of the gratings. This syrup is maintained with the mixture and is not allowed to drain away because it contains some of the soluble gratings solids and a small proportion of the essential oils. The sugared wet gratings are then placed on the partition 13 in the receptacle 10, the cover 28 is tightly closed and the agitators 21 and fan 25 are started. The trays 30 have been previously filled with a dehydrating agent which has an affinity for moisture but does not absorb the essential oil vapors to any appreciable extent. A dehydrating agent which liquefies on taking up moisture is desirable but any absorbent can be used which has an affinity for moisture much greater than its affinity for essential oils. When using calcium chloride, a form of this product in flakes and low in moisture is desirable.

The atmosphere inside the chambers 14 and 15 which may be air or some non-oxidizing gas, such as nitrogen, is circulated by the fan over the sugared wet gratings on the partition 13, through the flue 12 and over the calcium chloride trays 30 where the calcium chloride absorbs moisture from the gas. The dried gas is then returned by the fan through flue 11 to the gratings where it again absorbs moisture. The atmosphere in the dryer quickly becomes saturated with the vapor of the essential oils, but this vapor is not absorbed by the calcium chloride to any appreciable extent and once the free space of the dryer is saturated with the oil vapor, there is no further loss of oil from the gratings. Consequently, it is preferable to make the volume of the dryer as small as practical, while still providing sufficient space for a proper circulation of gas.

The dehydrating agent, such as calcium chloride, in the trays 30, gradually liquefies due to absorption of moisture and the liquid formed drains through the perforations 32 to the bottom of the shell 10. Only solid unspent calcium chloride is thus left on the trays 30 to carry on the drying process. The drying may be conveniently carried out at room temperature and a moisture content in the gratings not exceeding 5% may be obtained by about 18 hours or less of drying, using about 40 square feet of tray surface containing a layer of calcium chloride one inch thick for each 100 pounds of the wet grating-sugar mixture to be treated. Provisions may be made in the apparatus to refill the trays 30 with dehydrating agent, or the trays may be removable for this purpose. For example, the lower section of flue 12 may be removably held in place to allow access to the trays 30.

The essential oil of citrus fruit peel is subject to deterioration in the presence of oxygen and for this reason we prefer to employ an inert gas, such as nitrogen, within the dryer instead of air. Air, however, is entirely practical to use and has produced satisfactory results. It is also desirable to have the dried product packed in air tight containers in the presence of an inert gas and kept in cold storage.

If desired, a preservative may be added to the gratings either before the drying operation is started or after the gratings have been dried or partially dried. The addition of a small quantity of an edible oil to the gratings before drying to lower the vapor pressure of the essential oils in the drying apparatus and thereby further reduce the loss of essential oils during dehydration of the gratings may be desirable. Crude sesame oil is suitable for this purpose and has the additional advantage of containing an antioxidant. By reason of the mutual solubility of the essential oils and such an edible oil, the vapor pressure of volatile oils is substantially lowered during the drying operation. For example, about 5% of unpurified sesame or other edible oil may be mixed with the fresh gratings before addition of sugar thereto, thereby retarding oxidation of and conserving the citrus oils in the gratings. Other edible oils may be employed such as peanut oil in addition to or instead of sesame oil. The quantity of edible oil added should not be sufficient to affect the natural flavor of the product.

Farinaceous and carbohydrate materials may also be mixed with the gratings as described in the copending application of Jack Ser. No. 203,807, filed April 23, 1938. Oat flour is particularly suitable for use in accordance with our invention since it absorbs the essential oils holding them mechanically with the gratings. Some oxidation retarding is also obtained by the use of oat flour. About 5% of oat flour may be mixed with the fresh gratings prior to drying, with good results. These farinaceous or similar agents may also be used in conjunction with an edible oil if desired. While we have referred to the use of sucrose, other sugars such as dextrose and the like may be employed instead of, or in conjunction with the sucrose. A portion of the sugar may be replaced by corn syrup or corn syrup solids if desired. It may also be possible to dry citrus fruit peel gratings in accordance with our invention without employing any sugar, although the use of sugar is preferred because it forms a protective coating over the dried gratings and greatly enhances their keeping qualities and the retention of a natural flavor.

We have found that it is possible in accordance with this invention to produce citrus fruit gratings dehydrated to a moisture content of less than 15%, in some cases as low as 5% moisture, while still retaining 50% or more of the original essential oils in the peel. Such gratings when made from average fruit would contain at least 2% essential oils. The product of this invention may be very finely divided and, consequently, can be used as a flavoring ingredient for a great many purposes. The product may also be made with a sufficiently low moisture content to remove any stickiness, and the process has the advantage of utilizing in the final product all of the sugar originally employed.

By the term "peel" as used herein, we intend to include the outer covering of the citrus fruit, with or without part or all of the albedo. While gratings of the peel have been referred to particularly, it will be apparent that this invention may be practiced to advantage for dehydrating larger particles of the peel.

Subject matter disclosed but not claimed in this application is claimed in the copending application of Platt and Kratz, Ser. No. 203,749, filed April 23, 1938, or in the copending application of Jack, Ser. No. 203,807, filed April 23, 1938.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. Dehydrated citrus fruit peel containing not more than 15% moisture and at least 50% of the essential oils originally present in said peel, said peel being sugared and mixed with a small amount of an edible oil which does not substantially alter the flavor of the peel.

2. Dehydrated citrus fruit peel containing not more than 15% moisture and at least 50% of the essential oils originally present in said peel, said peel being sugared and mixed with a small proportion of a farinaceous material.

3. A method of preparing dried citrus fruit peel while conserving the essential oils therein comprising mixing pieces of said peel with sugar, and subjecting said mixture to a current of a limited volume of recirculating drying gas in a closed receptacle.

4. A method of preparing dried citrus fruit peel while conserving the essential oils therein comprising mixing pieces of said peel with sugar, placing said mixture in a closed receptacle, and circulating a current of a limited volume of drying gas alternately into contact with said mixture and a dehydrating agent.

5. A method as defined in claim 4 in which a small proportion of an edible oil is also mixed with the peel.

6. A method as defined in claim 4 in which a small proportion of a farinaceous material is also mixed with the peel.

7. A method as defined in claim 4 in which the dehydrating agent is calcium chloride.

8. A method as defined in claim 4 in which the drying gas is a non-oxidizing gas.

9. A method of preparing citrus fruit peel gratings comprising mixing about two parts of gratings of fresh citrus fruit peel with about one to four parts by weight of sugar, placing such mixture in a closed receptacle, and circulating a current of a predetermined limited volume of drying gas alternately over said mixture and a solid dehydrating agent in said closed receptacle until the moisture content of said mixture has been lowered at least to about 15%.

10. A method of preparing citrus fruit peel gratings comprising mixing about two parts of gratings of fresh citrus fruit peel with about one to four parts by weight of sugar, placing such mixture in one portion of a closed receptacle having a solid dehydrating agent disposed with an extended surface area in a separate portion of said receptacle, agitating said mixture, and circulating a current of gas wholly within said closed receptacle in contact alternately with said mixture and said dehydrating agent.

11. A method as defined in claim 10 in which the dehydrating agent is flake calcium chloride.

12. A method of preparing dehydrated citrus fruit peel containing a substantial quantity of the natural essential oils comprising finely dividing fresh citrus fruit peel, placing said finely divided peel in a closed container, and circulating a limited volume of a drying gas alternately into contact with said peel and a dehydrating agent.

ROBERT EVERETT WEBB.
WASHINGTON PLATT.

CERTIFICATE OF CORRECTION.

Patent No. 2,219,026. October 22, 1940.

ROBERT EVERETT WEBB, ET AL.

It is hereby certified that error appears in the printed specification of the above numbered patent requiring correction as follows: Page 3, second column, line 11, for "misture" read --moisture--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.